United States Patent Office 3,573,076
Patented Mar. 30, 1971

3,573,076
GLASS-CERAMIC ARTICLE AND METHOD
Hermann L. Rittler, Horseheads, N.Y., assignor to
Corning Glass Works, Corning, N.Y.
No Drawing. Continuation-in-part of application Ser. No.
365,178, May 5, 1964. This application Mar. 3, 1969,
Ser. No. 803,974
Int. Cl. C03c 3/22
U.S. Cl. 106—39          5 Claims

ABSTRACT OF THE DISCLOSURE

This invention relates to the strengthening of glass ceramic articles wherein the crystal content thereof comprises the predominant portion and containing beta-quartz stuffed with lithium and magnesium ions as the principal crystal phase. The strengthening effect is achieved through an ion exchange process taking place within a surface layer of the glass-ceramic article wherein potassium ions from an external source are exchanged for lithium ions in the beta-quartz, but wherein the structural nature of the crystals remain essentially unchanged, to cause compressive stresses to be developed in this surface layer.

---

This application is a continuation-in-part of my pending application, Ser. No. 365,178, filed May 5, 1964, now abandoned.

A glass-ceramic article is produced through the carefully controlled crystallization of a glass article in situ. The manufacturing process for glass-ceramic articles can be viewed in three general steps: first, a glass-forming batch usually containing a nucleating agent is melted; second, the melt is cooled and shaped into a glass article of desired dimensions; and, third, this glass article is exposed to a particular heat treatment practice which initially promotes the development of nuclei in the glass article that provide points for the subsequent growth of crystals thereon as the heat treatment is pursued.

Since this crystallization in situ is founded upon the essentially simultaneous growth on innumerable nuclei; the structure of a glass-ceramic article consists of relatively uniformly-sized, fine-grained crystals homogeneously dispersed in a residual glassy matrix, these crystals comprising the predominant proportion of the article. Thus, glass-ceramic articles are generally considered to be at least 50% by weight crystalline and, frequently, are actually over 90% by weight crystalline. Such high crystallinity results in an article demonstrating chemical and physical properties which are commonly very different from those of the parent glass but, rather, are more characteristic of those exhibited by a conventional crystalline article. Finally, the very high crystallinity of the glass-ceramic article will leave a residual glassy matrix having a far different composition from that of the parent glass inasmuch as the components comprising the crystals will have been precipitated therefrom.

Reference is hereby made to U.S. Pat. No. 2,920,971 for a more extensive discussion of the theoretical concepts and the practical considerations involved in the production of glass-ceramic articles as well as a description of the physical structure thereof. It will be quite apparent that the crystal phases present in glass-ceramic articles will depend upon the composition of the original glass and the heat treatment to which the glass is exposed. Glass-ceramic articles wherein "stuffed" beta-quartz composes the principal crystal phase and a method for making such articles are disclosed in U.S. Pat. No. 3,252,811, filed Dec. 11, 1963 in the name of G. H. Beall and assigned to a common assignee.

The term "beta-quartz," has been employed to designate a hexagonal trapezohedral form of silica ($SiO_2$) that is stable from 573°–870° C. and that is further characterized by a slightly negative coefficient of thermal expansion and a very low birefringence. It has been shown that this crystal and that known as beta-eucryptite $$(Li_2O \cdot Al_2O_3 \cdot 2SiO_2)$$

form a complete series of solid solutions. These solid solutions have been referred to as "stuffed derivatives" of beta-quartz by Buerger in his article, The Stuffed Derivatives of the Silica Structures, Am. Mineral. 39, 600–14 (1954). The author ascribes to these solid solutions a structure wherein some of the tetrahedral silicon ions in normal beta-quartz are replaced by aluminum ions and the resulting electrical charge defficiency is satisfied by "stuffing" the interstitial vacancies in the double helicoid silica structure with lithium ions.

It has since been shown that other ions, such as the magnesium ion, may also be "stuffed" in the silica structure either alone or in conjunction with the lithium ion. For example, a publication by Schreyer, W. and Schairer, J. F., Metastable Solid Solutions with Quartz-Type Structures on the Join $SiO_2$—$MgAl_2O_4$. Geophys. Lab. Paper No. 1357 (1961), shows that a series of metastable beta-quartz solid solutions can also be formed along the join $SiO_2$—$MgAl_2O_4$. In this case, aluminum for silicon substitution is accompanied by magnesium stuffing of beta-quartz interstitial vacancies. Only one $Mg^{2+}$ ion is required per $2Al^{3+}$ for $2Si^{4+}$ substitutions in this instance, whereas $2Li^+$ ions are required in the beta-eucryptite case.

The previously mentioned Beall patent discloses a family of transparent glass-ceramic materials in which the predominant crystal phase has been identified as composed of beta-quartz crystals "stuffed" with $Mg^{++}$ with or without $Li^+$ or $Zn^{++}$ ions. On the basis of the precedent mineral terminology, these glass-ceramic materials have been identified as "stuffed" beta-quartz glass-meramics.

While the Beall patent is primarily concerned with a limited range of compositions which provide a transparent crystal phase, it will be appreciated that this is not a characteristic of all "stuffed" beta-quartz glass-ceramics. Rather, the composition range encompassing such materials is considerably broader than that which describes the transparent type material. Accordingly, the terminology practice of the Beall patent is followed here and extended to include all glass-ceramics having a corresponding "stuffed" crystal structure regardless of the feature of transparency.

The diffusion of ions in any medium is a direct function of the structure of the medium itself. Hence, whereas a crystal has a long range ordered structure of ions, glass has only short range order and has even been deemed to consist of a random network of ions. This basic difference in structure greatly affects the ability of ions to diffuse therein.

The structure of glass is characterized by a network or framework composed of polyhedra of oxygen centered by small ions of high polarizing power (e.g. $Si^{+4}$, $B^{+3}$, $Al^{+3}$, $Ge^{+4}$, $P^{+5}$). These polyhedra are arranged in a generally random fashion so that only short range order exists. Thus silica glass is thought to be composed of a random network of $SiO_4$ tetrahedra, all of whose corners are shared with one another. In silicate glasses containing modifying oxides (e.g. $Na_2O$, $K_2O$, $MgO$, $CaO$, $BaO$, etc.) some of the shared corners (Si—O—Si bonds) are believed broken and oxygen ions are formed which are connected to only one silicon ion. The modifying ions remain in interstitial positions or structural vacancies. In modified aluminosilicate glasses, non-bridging oxygen ions are believed less common because as modifying ions are added to silicate glasses aluminum replaces silicon in the threedimensional corner shared tetrahedral network and the modifying ions remain in the interstices with the retention of charge balance.

In either case the larger ions of lower valence (modifiers) are thought to occur geometrically in interstitial positions within the basic silicate or aluminosilicate framework. They can thus be considered as completely or at least partially surrounded by linked framework silica tetrahedra. In other words, these ions can be considered as present in "structural cages" in the network.

Since the glassy network is random, the size of these cages or potential modified cation positions is variable and the number of cages is large with respect to the number of modifying ions. Therefore, it is likely that during ion exchange in a molten salt bath a small ion will jump out of a cage and a large ion will jump into another cage, very possibly a larger one. Even if the exchangeable ion in the glass and the ions in the molten salt are similar in size, it is likely that an ion leaving one cage will be replaced by an ion entering a different and previously vacant cage. Thus, ion exchange phenomena in a glassy network are structurally random and there is no guarantee that certain structural vacancies or positions filled before exchange will be filled after exchange.

The concept of exchanging ions within a crystal structure has been approciated for many years. The term "ion exchange," as commonly used, refers to replacement reactions in clay and zeolite-type materials carried out in aqueous solutions at temperatures below 100° C. These materials generally consist of alternating, parallel, essentially two-dimensional layers which are stacked together with interlayer spaces therebetween. To maintain electroneutrality between these layers, cations are incorporated into the interlayer spaces. The extent and rate of exchange in these materials is a function not only of the concentrations of the exchanging species but also of the structure of the crystalline phase undergoing exchange. When these materials are suspended in an aqueous solution which can penetrate between the layers, these cations are freely mobile and can exchange with cations present in the solution. Hence, the cation exchange capacity of these materials arises principally from the replacement of cations at defined positions in the interlayer spaces. These interlayer spaces can be likened to channels and it will be apparent that this type of low temperature ion exchange will occur between the loosely bonded ions in a crystal and those in a solution only if there is a suitable channel within the crystal to allow diffusion to take place.

Isomorphous substitution in crystals involves the replacement of the structural cations within the crystal lattice by other cations. This type of substitution may be regarded as a form of ion exchange but the accomplishment thereof requires crystallizing the materials from melts of the appropriate composition. However, the amount and type of isomorphous substitutions can often be very important in affecting the character of a material which is to be subsequently subjected to the conventional low temperature ion exchange reaction described above.

The instant invention contemplates the use of high temperature ion exchange to effect substitutions within the crystalline lattice to thereby produce materials similar to those secured through isomorphous substitution. However, in contrast to glasses, high temperature ion exchange in crystals is much more restricted. The various ion species are specifically located in defined positions within the lattice. When an ion leaves a crystalline position, the position is generally filled by another ion from an external source of ions. The geometry of the crystals often restricts the size of the replacing ion. Isomorphous substitutions in the crystal can only sometimes be of help in determining which ion pairs are exchangeable under the rigid conditions imposed by the long range repetitive order of crystals. Thus, for example, sodium ions can replace lithium ions in the beta-spodumene crystal structure but this exchange cannot take place in the beta-quartz or beta-eucryptite solid solution structure where the sodium ion appears to be too large for the structure to tolerate and the crystalline structure is destroyed if the exchange is forced to take place. As opposed to this, the sodium-for-lithium ion exchange can always be carried out in aluminosilicate glasses without any phase change.

Hence, in short, crystals, because of their definite geometry, impose stringent limitations upon ion exchange. Glasses, on the other hand, because they are random structures capable of incorporating almost all chemical species in a substantial degree, demonstrate no such basic restrictions.

Of course, the ability of a crystalline phase to accept another cation to replace an ion already in its structure through an ion exchange mechanism is not necessarily useful. Many such exchanges will not lead to compressive stress and consequent strengthening. When strength is the desired goal, it is necessary to tailor the exchange to produce compressive stress in the exchanged layer. The compressive stress may arise through crowding of the existing structure or through transformation of that structure to one which comes under compression by some other mechanism; e.g., difference in coefficients of thermal expansion or density changes.

Chemical alteration in situ of the crystal phase in a glass-ceramic material by an ion exchange is generally disclosed and claimed in an application, Ser. No. 365,117, filed May 5, 1964, in the name of R. O. Voss, now abandoned. This application is entitled "Glass-Ceramic Article and Method" and is assigned to a common assignee. In addition to its general disclosure regarding ion exchange in a glass-ceramic material, the Voss application specifically discloses the strengthening of a glass-ceramic article having a beta-spodumene crystal phase. The strengthening is achieved by exchanging the lithium ion of such crystal phase for a larger ion within a surface layer on the article to develop compressive stress within such surface layer. It has been observed that certain "stuffed" beta-quartz glass-ceramics can, by extended and/or higher temperature heat treatment be converted to a beta-spodumene. In such case, the material is strengthened as described by Voss and/or others.

As pointed out in the Voss application, the effect of ion exchange differs depending on the particular crystal phase involved, particularly in regard to strengthening. Specifically, it has been found that "stuffed" beta-quartz glass-ceramics containing magnesium and lithium ions do not undergo strengthening when subjected to conventional ion exchange treatment in a molten sodium salt bath, as do beta-spodumene glass ceramic materials, for example.

Since the sodium ion is smaller and has a considerably greater mobility than the potassium ion, there is nothing to suggest that any degree of strengthening could be achieved by an exchange involving the latter ion. Nevertheless, I have discovered that potassium ions do exchange with lithium ions in a magnesium-lithium "stuffed" beta-quartz glass-ceramic material. I have further found that this exchange in the surface of an article characterized by such a crystal phase develops strengthening compressive stresses.

Based on these discoveries, my invention resides in a strengthened glass-ceramic article having a beta-quartz crystal phase wherein the crystals are "stuffed" with magnesium and lithium ions and characterized by a compressively stressed surface layer wherein a portion of the "stuffed" lithium ions are replaced by potassium ions. The invention further resides in a method of strengthening such a glass-ceramic article which comprises bringing a source of exchangeable potassium ions into contact with the surface of the article at a temperature and for a time sufficient to effect ion exchange between the lithium ions of the crystal and the potassium ions contacting the surface. Preferably, the exchange is carried out at temperatures between 700° and 800° C. for a period of time from about 4 to 16 hours to develop a maximum tumble abraded strength in the article.

Reference to an exchangeable potassium ion in this application means a potassium ion that is capable of migrating or diffusing in depth under a chemical force such as is supplied by a differential ion concentration or under a physical force such as is supplied by heat and/or electrical potential which are controllable by the application or removal of such chemical or physical influence. Since the ion exchange reaction is a diffusion-type process, the amount of exchange increases with the square root of time.

In practicing the invention, any glass-ceramic article having as its predominant crystal phase a beta-quartz crystal stuffed with magnesium and lithium ions may be employed. In general, however, it is preferable to employ glass-ceramics of the type disclosed in the previously mentioned Beall patent because of their characteristic transparency. However, it will be readily apparent that such transparency is not a prerequisite for strengthening in accordance with the present invention, and that the invention is therefore not limited to such transparent materials.

As disclosed in the Beall patent, a lithium-magnesium stuffed beta-quartz glass-ceramic may be produced by melting at temperatures on the order of 1600°–1800° C. a suitably selected and proportioned glass batch capable of providing, in addition to the essential oxides of lithium, magnesium, aluminum and silicon, zirconia ($ZrO_2$) as a nucleating agent. The glass is melted and formed in accordance with known glassworking practices and then converted to the glass-ceramic state by heat treatment within the range of 750°–1150° C. To permit development of a fine grained, high quality, crystalline body with a minimum of deformation, the heat treatment preferably involves holding the article at selected temperatures within the given range for suitable times to permit nucleation and crystal development to proceed fully.

In accordance with the present invention, the glass-ceramic article thus formed is then brought into contact with a material containing exchangeable potassium ions at a temperature at which ion exchange between the potassium ions of the contacting material and the lithium ions of the crystals will occur. To the extent that such ion exchange does occur below about 600° C. it is generally too slow to be of interest. The rate of exchange increases with temperature and ion exchange temperatures of 700° C. and above are generally preferred.

In carrying out the ion exchange, it is generally convenient to employ a molten salt bath and immerse the article in the molten salt for a suitable length of time to effect the desired ion exchange. However, available potassium salts, and mixtures thereof, are limited and tend to be highly corrosive either to the glass-ceramic material itself or to available container and handling equipment. Accordingly, it has not as yet been found practical to employ temperatures above about 800° C. A eutectic mixture of 48% potassium sulfate and 52% potassium chloride has been found to provide a particularly effective bath for present purposes.

The time required to impart an optimum abraded strength will depend on temperatures of treatment. At temperatures within the range of 700°–800° C. times of about 4–16 hours will normally provide such maximum strength. However, where a lesser degree of strengthening will suffice, lesser times and/or temperatures may be employed. Thus, an optimum set of conditions in any instance can readily be determined by routine experiments in accordance with the specific embodiments hereafter described.

The following specific embodiments of the invention are therefore set forth to more fully illustrate practice of the invention and the advantageous results attained thereby.

EXAMPLE 1

A batch glass was prepared by mixing together raw materials in proportions calculated to yield a glass having the following composition in weight percent on an oxide basis: 70.8% $SiO_2$, 18.6% $Al_2O_3$, 4.4% MgO, 1.9% $Li_2O$, 3.8% $ZrO_2$ and 0.5% $As_2O_3$. The glass batch wts melted in a conventional melting unit at a temperature of about 1600° C. and, after being brought to a suitable state of homogeneity, was worked into glass articles including quarter-inch diameter cane designed to be cut into 4" lengths for strength measuring purposes. The glass cane was then converted to the glass ceramic state in accordance with a heat treating schedule wherein the material was held for 4 hours each at 780° C., 850° C., and 900° C. Intermediate each of these temperatures, the furnace was heated at its maximum rate, and, following the heat treatment, was cooled by opening to air.

The structure of the crystallized articles was examined employing X-ray diffraction analysis and transmission and replica electron micrographs. The articles were determined to be greater than about 70% by weight crystalline with stuffed beta-quartz comprising by far the predominant crystal phase. Very minor amounts of spinel and/or tetragonal zirconia were frequently observed but the total thereof was less than 10%.

The glass-ceramic cane thus produced was cut into four inch lengths and immersed for 6 hours in a molten salt bath composed of 48% $K_2SO_4$ and 52% KCl, the bath being maintained at a temperature of 780° C. After cooling and cleaning, the cane samples were then given a severe surface abrasion by tubling in contact with 30 grit silicon carbide particles for several minutes. Strength was then determined by mounting each cane sample on spaced knife edges in a standard testing machine wherein a gradually increasing load was applied against the opposite side of the cane intermediate the spaced knife edge supports until breakage in flexure occurred. From this measurement on each sample, a modulus of rupture (MOR) value was calculated and the values for the set of cane samples averaged. This provided a representative strength value of 51,900 p.s.i. for the particular material and ion exchange treatment. By way of comparison, untreated cane abraded in a similar manner has an average MOR of about 12,000 p.s.i.

Since the strength of these articles is a function of the surface compression layer developed thereon through the ion exchange process and, inasmuch as substantially all service applications for these articles will involve injury to the surface thereof even if only that sustained during normal handling and shipping, the permanent or practical strength displayed by the articles is that which is demonstrated after considerable surface abrasion. Therefore, the above-described tumble abrasion test is one that was first devised in the glass industry to simulate the substantial surface abuse which might be experienced by glass articles in service and is believed to be equally applicable with glass-ceramic articles. Preferably, the depth of the surface compression layer is at least 0.001" to insure satisfactory abraded strength in the article. The depth of the compression layer can be readily measured through the light microscope and/or electron microscope examination of a cross-section of the article.

EXAMPLE 2

A number of sets of cane samples, cerammed and strengthened as just described, were heated in air at different temperatures and times. After such treatment, they were tumble abraded and their MOR determined in the usual manner. The following table outlines the times (in hours) and temperatures (in ° C.) of treatment and the average abraded MOR (in thousands of p.s.i.) determined for the set having been given each indicated treatment.

| Temperature, ° C. | Time (hours) | | |
| --- | --- | --- | --- |
| | 0 | 10 | 100 |
| 500 | 51.9 | 46.0 | 51.3 |
| 600 | 51.9 | 49.6 | 51.0 |
| 700 | 51.9 | 49.5 | 38.2 |

The drop after ten hours treatment is not considered significant, but rather within the limits of experimental error, particularly in view of the 100 hour values. Of course, the drop after 100 hours at 700° C. is significant.

These data illustrate the property of high temperature strength retention, or resistances to thermal decay, that characterizes glass-ceramics ion exchange strengthened in accordance with my invention. Because of this feature, they are capable of extended use at temperatures on the order of 600°–700° C. In contrast, for example, the strength induced in a beta-spodumene glass-ceramic by sodium ion exchange with lithium ion tends to decay rapidly at temperatures above 400° C.

EXAMPLE 3

A further set of glass-ceramic cane samples, produced as described in Example 1, was immersed in the same salt bath for a period of 16 hours with the bath operating at a temperature of 750° C. The average MOR value calculated for this set of samples after a comparable abrasion treatment was 50,300 p.s.i. This indicates the ability to achieve comparable strength with somewhat lower temperature and longer time.

EXAMPLE 4

A glass batch was prepared to yield a glass having the following calculated composition in percent by weight: 71.0% $SiO_2$, 18.7% $Al_2O_3$, 3.6% MgO, 2.6% $Li_2O$, 3.5% $ZrO_2$ and 0.6% $As_2O_3$. The glass was melted and formed into ware including cane as described in the previous example. After being converted to the glass-ceramic state in accordance with the heat treatment of the prior example, two sets of cane samples were prepared for ion exchange treatment. X-ray diffraction analysis coupled with electron microscope examination determined these glass-ceramic articles to be crystallized similarly to those of Example 1, both in identity and number of crystals.

One set of samples was immersed in the 48% $K_2SO_4$–52% KCl salt bath for 16 hours with the bath operating at a temperature of 720° C. The second set was immersed in the bath for a period of 5 hours at 780° C. After cooling and cleaning, the cane samples were tumble abraded and then loaded to determine their flexural breaking point in accordance with the procedure in Example 1. The calculated average MOR for the samples treated at 720° C. was 44,500 p.s.i., while the comparable value for the sample treated at 780° C. was 36,700 p.s.i., thus indicating that a somewhat longer time at 780° C. would be required for optimum strengthening.

Although in Examples 1–4 a bath of molten potassium salt was utilized as the source of exchangeable potassium ions and that is surely the preferred manner for carrying out the ion exchange process, it will be understood that other sources of potassium ions can be employed which are operable at the temperatures required in this invention. Hence, the use of pastes and vapors is well-known in the conventional ion exchange staining arts. Further, while it can be appreciated that the most rapid rate of exchange and the highest strengths will commonly be attained where pure potassium ion-containing materials are utilized as the exchange medium, some contamination thereof can be tolerated. Nevertheless, the determination of the maximum amount of contamination that can be tolerated and still secure a high strength article is believed to be well within the ingenuity of one of ordinary skill in the art.

This invention contemplates the replacement of lithium ions by potassium ions in the crystal structure of beta-quartz stuffed with magnesium and lithium ions. That this exchange does indeed occur can be demonstrated through X-ray diffraction analysis of the surface crystals prior to and subsequent to the ion exchange reaction. The exchange of potassium ions for lithium ions is evident from the following table which reports several of the $d$-spacings and the intensities recorded thereat in an X-ray diffraction pattern made of the surface crystallization of Example 1 before and after the ion exchange treatment. The intensities observed are arbitrarily designated as very strong (v.s.), strong (s.), moderate (m.), and weak (w.).

Before Exchange

| $d$: | I |
| --- | --- |
| 4.48 | m. |
| 3.47 | v.s. |
| 2.98 | w. ($ZrO_2$) |
| 2.59 | m. |
| 2.33 | w. |
| 2.23 | m. |
| 2.07 | m. |
| 1.87 | v.s. |
| 1.82 | w. ($ZrO_2$) |
| 1.61 | s. |
| 1.40 | m. |

52% KCl—48% $K_2SO_4$
6 Hours at 780° C.

| $d$: | I |
| --- | --- |
| 4.53 | m. |
| 3.48 | v.s. |
| 2.98 | w. ($ZrO_2$) |
| 2.59 | w. |
| 2.33 | w. |
| 2.23 | w. |
| 2.07 | w. |
| 1.87 | m. |
| 1.82 | w. ($ZrO_2$) |
| 1.61 | m. |
| 1.40 | w. |

It is believed that this table clearly illustrates that the basic structure of the stuffed beta-quartz crystals is retained during the ion replacement process, since the peaks in the diffraction pattern characteristic of the beta-quartz crystals before the ion exchange are still present after the exchange, but the spacings and intensities thereof vary somewhat. These variations bespeak of a distortion and expansion of the crystal cell but not the destruction thereof, caused by the crowding of a larger potassium ion into the site within the crystal previously occupied by the small lithium ion.

Inasmuch as the glass-ceramic articles of this invention are highly crystalline, not only is the amount of residual glassy matrix very small, but the composition thereof is very different from that of the parent glass. Therefore, in the preferred embodiment of the invention, essentially all of the alkali metal ions will be included in the crystal structure of the beta-quartz and any other incidental crystal phases present in the article, leaving a residual glassy matrix consisting principally of silica. Some alkali metal ions outside of those incorporated into the crystals can be tolerated but amounts in excess of about 5% by weight frequently result in a coarse-grained rather than the desired uniformly fine-grained article. These "contaminant" alkali metal ions in the residual glassy matrix can also, of course, be exchanged with the potassium ions during the ion exchange process, but, it is equally apparent that, since the amount of such ions is very small and the total content of glass in the crystallized article is very small, the effect of this exchange upon the properties of the article would be virtually negligible when related to the effect produced through the exchange occurring within the beta-quartz crystals.

Finally, inasmuch as the alkali metal ions in the glass-ceramic articles of this invention are substantially absent from the residual glassy matrix, the ion replacement reaction promoting the surface compression layer must necessarily occur within the crystals. However, whereas stuffed beta-quartz constitutes the vast majority of the crystallization, minor amounts of other crystals can be present, as has been demonstrated above. Nevertheless, since the presence of these incidental crystals can dilute the maximum strengthening effect which is attainable when stuffed beta-quartz comprises the sole crystal phase, it is preferable to limit the amount of all such extraneous crystallization to less than about 20% of the total crystallization.

I claim:

1. A unitary glass-ceramic article of high strength with an integral surface compressive stress layer and an interior portion and having a crystal content of at least 70% by weight of the article, wherein the crystals of said interior portion consist essentially of beta-quartz stuffed with lithium and magnesium ions and the crystals of said surface compressive stress layer consist essentially of beta-quartz stuffed with lithium and magnesium ions, the structural nature of said latter beta-quartz crystals being essentially unchanged but in at least a portion of which the molar concentration of lithium ions is less with a corresponding increase in the molar concentration of potassium ions.

2. A glass-ceramic article according to claim 1 wherein said interior portion consists essentially of $Li_2O$, $MgO$, $Al_2O_3$, $SiO_2$, and $ZrO_2$.

3. A unitary method for making a glass-ceramic article of high strength wherein the crystal content thereof constitutes at least 70% by weight of the article and having an integral surface compressive stress layer and an interior portion which comprises contacting a glass-ceramic article consisting essentially of $Li_2O$, $MgO$, $Al_2O_3$, $SiO_2$ and $ZrO_2$ and consisting essentially of beta-quartz stuffed with lithium and magnesium ions as the crystal phase at a temperature between about 600°–800° C. with a source of exchangeable potassium ions for a period of time sufficient to replace at least part of the lithium ions of said beta-quartz in a surface layer of the article with potassium ions, said replacement not changing the essential structural nature of the beta-quartz crystals but thereby effecting an integral compressively stressed surface layer on the article.

4. A method according to claim 3 wherein said glass-ceramic article consists essentially of $Li_2O$, $MgO$, $Al_2O_3$, $SiO_2$, and $ZrO_2$.

5. A method according to claim 3 wherein said glass-ceramic article is contacted with a source of exchangeable potassium ions at a temperature between about 700°–800° C. for about 4–16 hours.

References Cited

UNITED STATES PATENTS

| | | | |
|---|---|---|---|
| 2,779,136 | 1/1957 | Hood et al. | 65—30X |
| 3,218,220 | 11/1965 | Weber | 65—30X |
| 3,252,811 | 5/1956 | Beall | 65—33X |
| 3,282,770 | 11/1966 | Stookey et al. | 65—30X |
| 3,482,513 | 2/1969 | Denman | 65—33X |

OTHER REFERENCES

Kistler, S.S.: "Stresses in Glass Produced by Non Uniform Exchange of Monovalent Ions," U. of Am. Cer. Soc., vol. 45, No. 2, pp. 59–68, February 1962.

S. LEON BASHORE, Primary Examiner

U.S. Cl. X.R.

65—30, 33